(No Model.) 4 Sheets—Sheet 2.

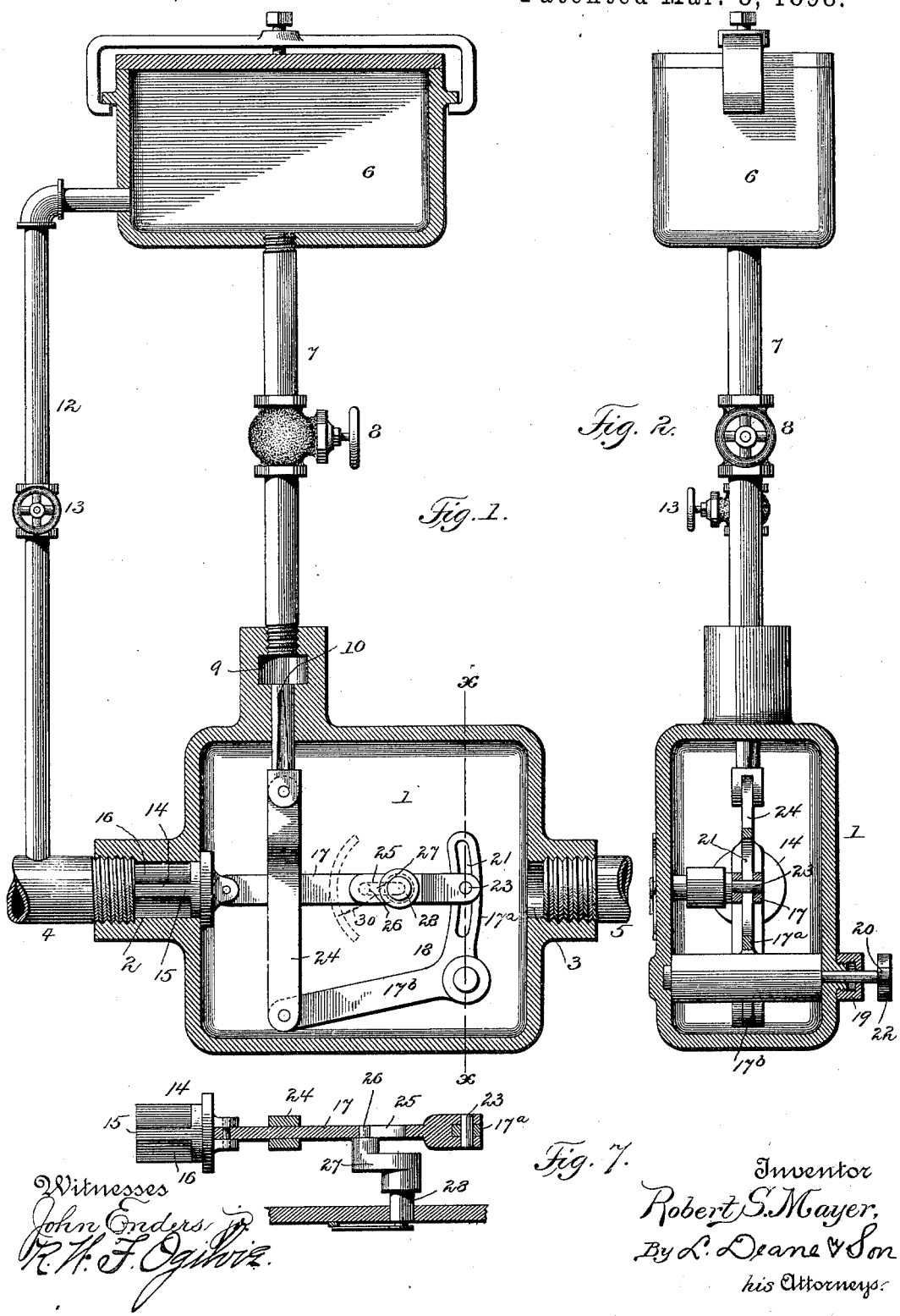

R. S. MAYER.
APPARATUS FOR PURIFYING WATER.

No. 600,206. Patented Mar. 8, 1898.

Witnesses
John Enders
R. W. F. Ogilvie

Inventor
Robert S. Mayer,
By L. Deane & Son
his Attorneys.

(No Model.) 4 Sheets—Sheet 3.

R. S. MAYER.
APPARATUS FOR PURIFYING WATER.

No. 600,206. Patented Mar. 8, 1898.

Witnesses
John Enders, Jr.
R. W. F. Ogilvie.

Inventor
Robert S. Mayer,
By L. Deane & Son
his Attorneys.

(No Model.) 4 Sheets—Sheet 4.
R. S. MAYER.
APPARATUS FOR PURIFYING WATER.
No. 600,206. Patented Mar. 8, 1898.
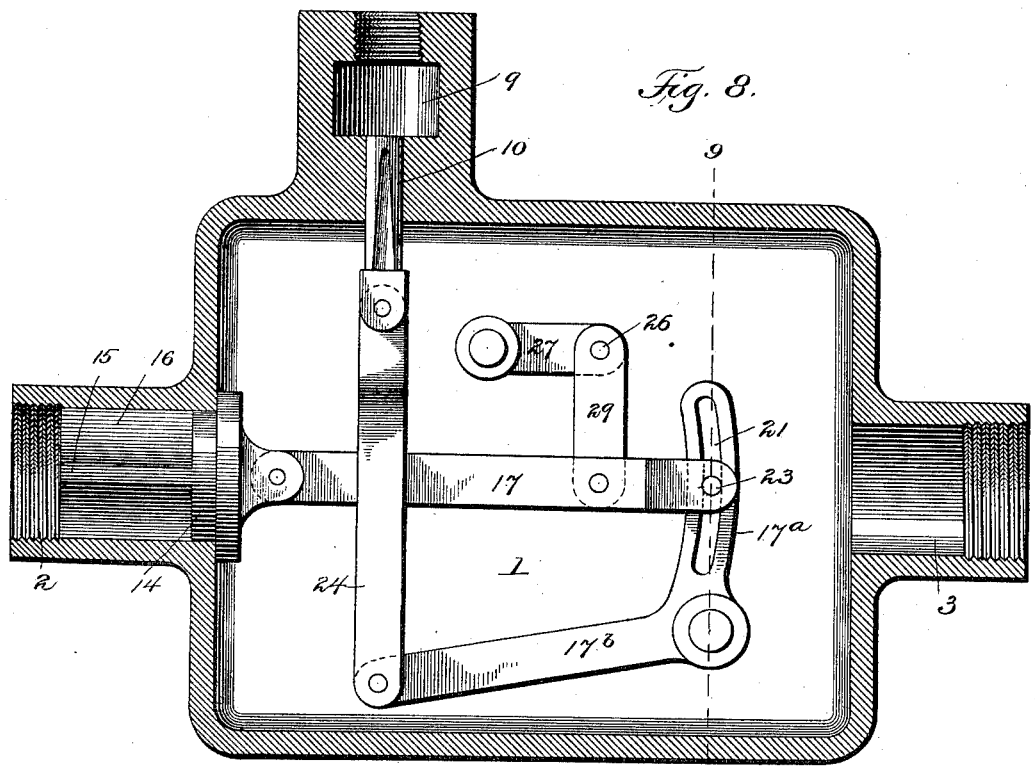
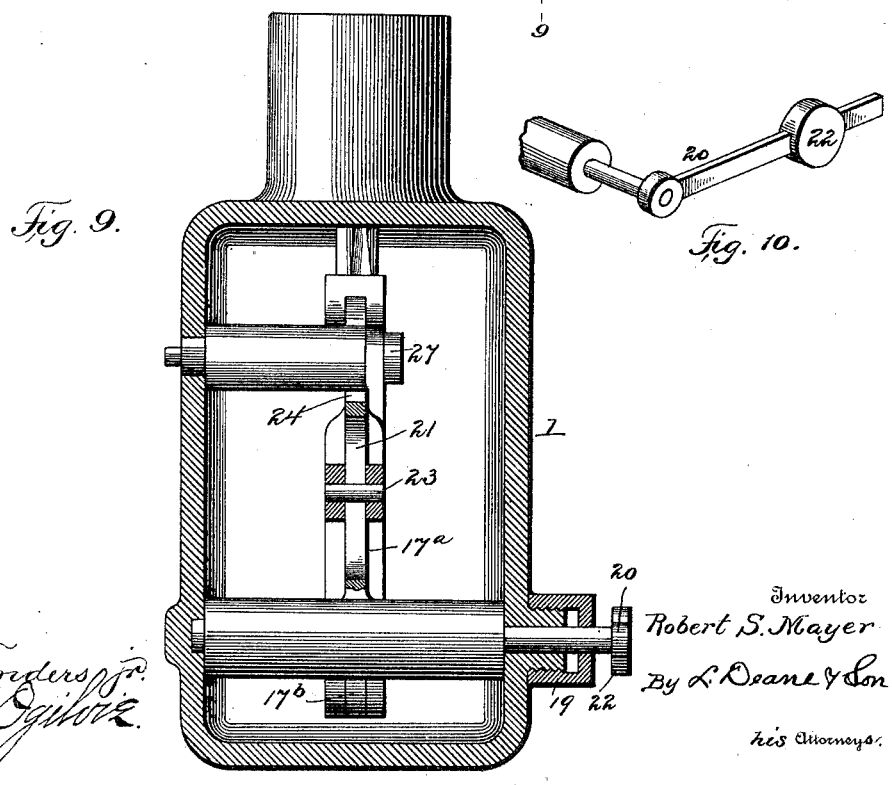
Witnesses
John Enders Jr.
R. W. F. Ogilvie
Inventor
Robert S. Mayer
By L. Deane & Son
his Attorneys

United States Patent Office.

ROBERT SMITH MAYER, OF CINCINNATI, OHIO.

APPARATUS FOR PURIFYING WATER.

SPECIFICATION forming part of Letters Patent No. 600,206, dated March 8, 1898.

Application filed May 7, 1897. Serial No. 635,560. (No model.)

*To all whom it may concern:*

Be it known that I, ROBERT SMITH MAYER, a citizen of the United States, residing at Cincinnati, in the county of Hamilton and State of Ohio, have invented certain new and useful Improvements in Water-Purifying Apparatus; and I do hereby declare the following to be a full, clear, and exact description of the invention, such as will enable others skilled in the art to which it appertains to make and use the same.

My invention relates to water-purifying apparatus of that class or description in which the purification is effected by means of a chemical solution mixed with water.

The object of the invention is to provide improved means for automatically regulating the supply of the chemical solution to the water by the pressure of the latter, whereby a larger amount of the solution is supplied when a larger volume of water is passing through the apparatus.

It is also an object to provide improved means for adjusting the chemical-valve, so that a larger amount of the solution can be supplied when the water is very muddy or turbid than when comparatively clear.

The invention consists, essentially, in a mixing tank or receptacle provided with opposite inlet and outlet openings with which the inlet and outlet pipes are respectively connected, a chemical-tank located above the same and communicating therewith, a circulating-pipe connected therewith and with the inlet-pipe, a piston-valve located in the inlet-opening, a valve located in the pipe connecting the water and chemical tanks, and a lever connection between said valves, whereby the chemical-valve is operated by the movement of the piston-valve.

It also consists in certain novel features of construction and combination of parts, all of which will be hereinafter fully described and claimed.

Figure 3:
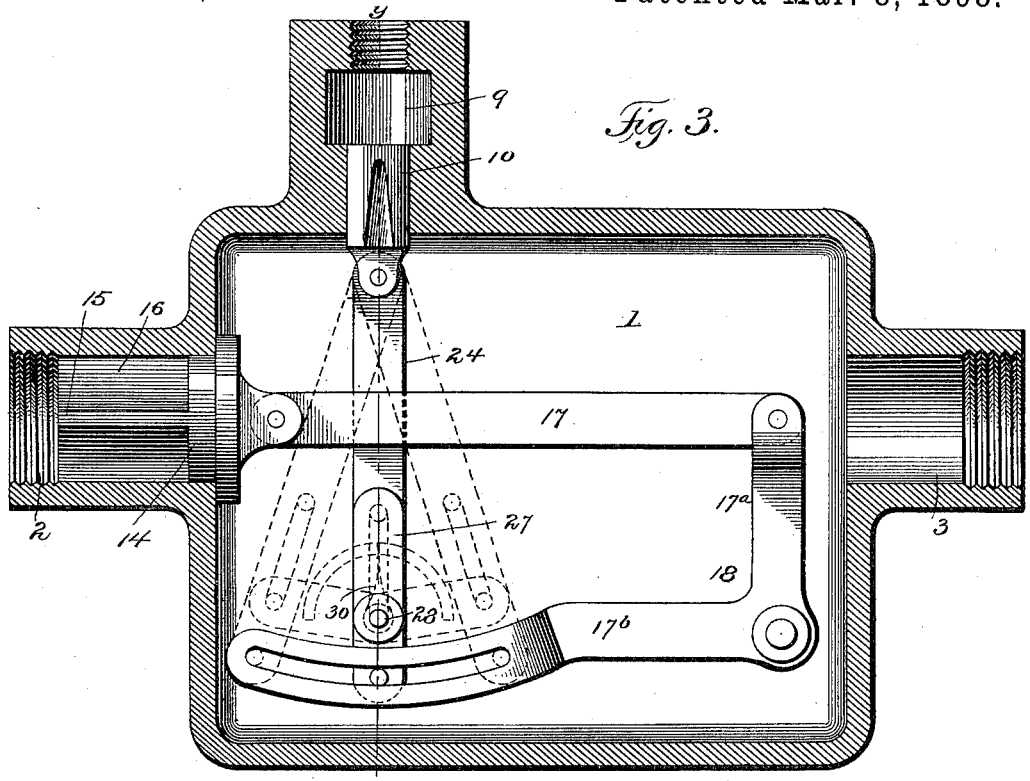
Figure 4:
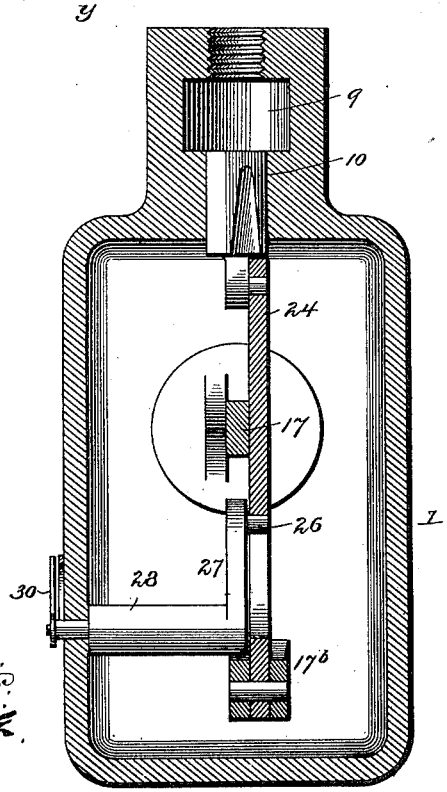
Figure 5:
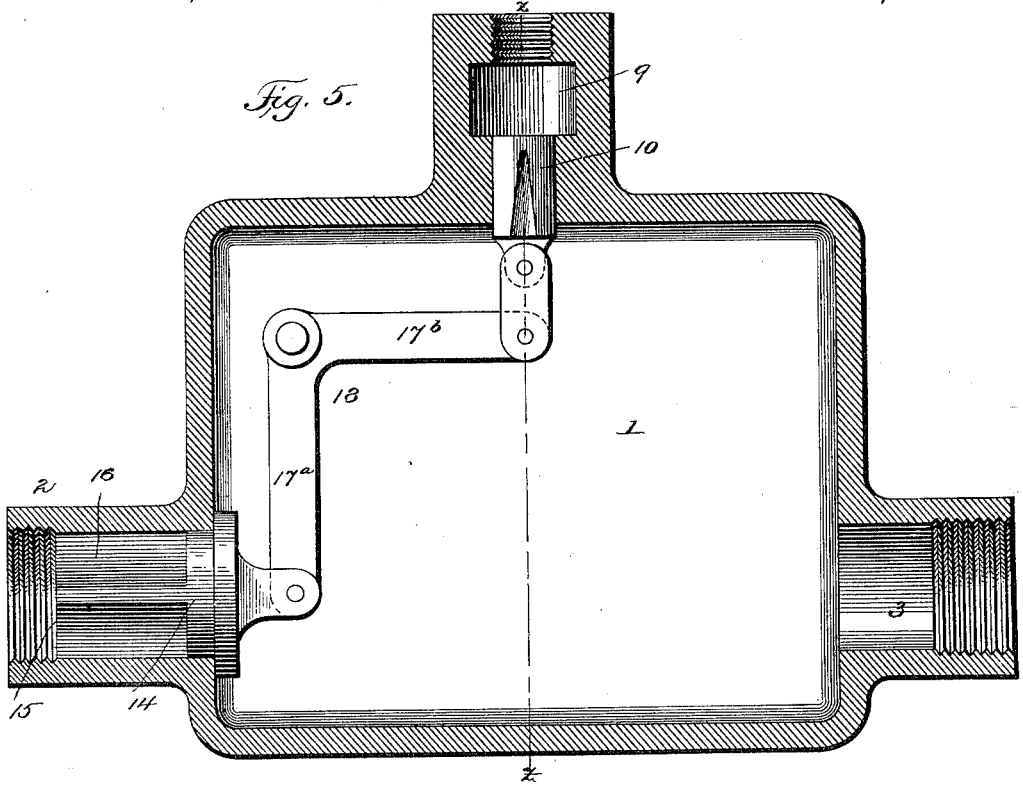
Figure 6:
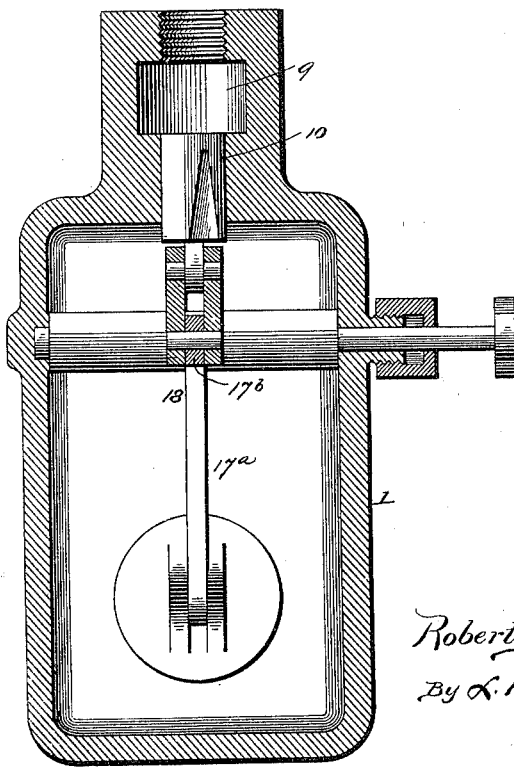

In the accompanying drawings, Figure 1 is a longitudinal sectional view of a water-purifying apparatus constructed in accordance with my invention. Fig. 2 is a transverse section on the line $x\ x$ of Fig. 1. Fig. 3 is a longitudinal sectional view of a modified construction. Fig. 4 is a sectional view of the same on the line $y\ y$ of Fig. 3. Fig. 5 is a longitudinal sectional view of another modification. Fig. 6 is a transverse sectional view on the line $z\ z$ of Fig. 5. Fig. 7 is a detail horizontal section. Fig. 8 is a longitudinal sectional view of another modification. Fig. 9 is a vertical section on the line 9 9, Fig. 8. Fig. 10 is a detail perspective view of the weighted arm.

In the said drawings the reference-numeral 1 designates a water-tank of any suitable size or material which serves as a mixing-chamber for the water and chemicals, provided at opposite ends with an inlet-opening 2 and an outlet-opening 3, with which are respectively connected inlet and outlet pipes 4 and 5. Located above said tank is a chemical tank or receptacle 6 for containing a soluble chemical—such as alum crystals, for instance—connected with the water or mixing tank by a vertical pipe 7, provided with a stop-cock or valve 8. At the lower end of this pipe is an enlarged chamber 9, and fitting in a cylindrical opening communicating therewith and with said mixing-tank is a vertically-movable cylindrical valve 10, having tapering passages in the periphery extending from about midway thereof to the lower end. Connected with said chemical-tank and the inlet-pipe 4 is a circulating-pipe 12, provided with a stop-cock or valve 13.

Located in the inner end of the inlet-opening 2 is a piston or wing valve 14, the stem 15 of which is formed with a number of grooves 16, forming water-passages. This stem is slidable in said opening and is adapted to be opened by the water flowing into the mixing-tank through the said inlet-opening. Pivotally connected with this valve 14 is a bifurcated link 17, also connected to the vertical arm of an elbow or bell-crank lever 18, located in said tank. One end of the journal of this lever passes through a stuffing-box 19 in the side of the tank and is provided with an arm 20, having an adjustable weight 22 for closing the valve. The said vertical arm 17ᵃ of the lever is formed with a curved slot 21, with which engages a pin 23, secured to the bifurcated end of the link. The other or horizontal arm 17ᵇ of said lever 18 is pivotally connected with the lower end of a link or arm 24, the upper end of which is pivotally connected with the chemical-valve 10.

The link 17 passes between the forks of this arm or link 24. The link 17 is formed with a horizontal slot 25, with which engages a pin 26 on a crank 27, secured to a shaft 28, journaled in one of the sides of the mixing-tank and projecting therethrough. The object of this crank is to adjust the said valve by turning the shaft 28, so as to allow more or less of the chemical solution to be admitted to the mixing-tank by the same movement of the piston-valve, with which the said chemical-valve is connected, as described, and the outer end of the shaft is provided with a pointer 30, by which the position of the chemical-valve can be ascertained.

The operation is as follows: The chemical tank or receptacle is supplied with a suitable chemical, such as alum crystals, and water being turned on will flow from the inlet-pipe to the mixing-tank. The resistance of the piston-valve will cause a portion of the water to be supplied to the chemical-tank through the circulating-pipe, which water will become saturated or impregnated with the chemical and will be fed to the water-tank through the chemical-valve and will mix therewith and be conducted to the filtering or settling vessel (not shown) by the outlet-pipe. By means of the connections between the piston and chemical valves the latter will be elevated more or less, according to the volume of water passing through the apparatus, so that a larger supply of the solution will be fed when a larger volume of water passes through the apparatus than when a smaller amount is passing therethrough, as the farther the piston-valve is moved away from the inlet-opening the greater will be the movement of the chemical-valve, so that a larger portion of the water-passages in the latter will be uncovered. The adjustable weight 22 on the arm 20 of the lever-journal serves as a counterbalance to the water-pressure. It also serves to regulate the back pressure on the inlet piston-valve and force more or less water through the circulating-pipe and chemical-tank.

By throwing the link 17 toward the free end of the slotted arm of the bell-crank lever the upward movement or stroke of the chemical-valve will be decreased, and by a reverse movement the pin 23 will be thrown toward the opposite end of the slot in the arm and the stroke of the valve increased. By this means the feed of the solution can be adjusted according to whether the water is very turbid or comparatively clear.

In the modification shown in Figs. 3 and 4 the construction is similar to that above described, with the exception that the link connected with the chemical-valve is not bifurcated. In this instance also the slotted end of the bell-crank lever, which is bifurcated, embraces the lower end of the said link. The operation will be substantially similar to that above described, with the exception of the manner of regulating the stroke of the chemical-valve. In this instance the stem connected with the chemical-valve is thrown to one side or the other of the perpendicular line by means of the pin 26, crank 27, and shaft 28.

In the modification shown in Figs. 5 and 6 the elbow or bell-crank lever is connected directly with the piston and chemical valves, the means for adjusting the latter valve being dispensed with; otherwise the construction is the same.

While I have shown the chemical-tank as being located above the mixing-tank, it may be located at one side thereof or below the same or at any other point found convenient, as the chemical solution will be fed to the mixing-tank by the pressure of the water from the circulating-pipe.

In the modification shown in Figs. 8 and 9 the construction is the same as that shown in Figs. 1 and 2, except that the crank 27 is secured to a shaft journaled in the side of the mixing-tank and is connected by an arm 29 with the link 17. By this construction friction between the parts is greatly reduced.

Having fully described my invention, what I claim is—

1. In a chemical water-purifying apparatus, the combination with the mixing-tank, having inlet and outlet openings and pipes, the chemical-tank, the pipe connecting said tanks, and the circulating-pipe, of the chemical-valve, the piston-valve and the elbow or bell-crank lever connected therewith whereby the chemical-valve is operated by the movement of the piston-valve, substantially as described.

2. In a chemical water-purifying apparatus, the combination with the mixing-tank, having inlet and outlet openings and pipes, the chemical-tank, the pipe connecting said tanks, having an enlarged chamber near the lower end, and the circulating-pipe, of the piston-valve, the cylindrical chemical-valve having water-passages in its periphery and the weighted bell-crank lever connected with said valves, substantially as described.

3. In a chemical water-purifying apparatus, the combination with the mixing-tank having inlet and outlet pipes and openings, the chemical-tank, the pipe connecting said tanks having a valve-chamber near its lower end, the chemical-valve located therein having peripheral water-passages, and the circulating-pipe connected with said inlet-pipe and the chemical-tank, of the piston-valve located in said inlet-opening, the bell-crank lever connecting said valves, and the journal thereof passing through said tank and provided with a weighted arm, substantially as described.

4. In a chemical water-purifying apparatus, the combination with the mixing-tank having inlet and outlet pipes and openings, the chemical-tank, the pipe connecting said tanks, the chemical-valve in the lower end thereof, and the circulating-pipe, of the piston-valve located in the said inlet-opening, the link connected therewith and provided with a pin, the bell-crank lever having a slot in its vertical arm with which said pin engages, the arm pivotally connected with the chemical-valve and connected with the other arm of said lever, the pivoted crank, the shaft of which extends outside of the mixing-chamber, and the pin on said crank working in a slot in the link connected with the piston-valve, substantially as described.

In testimony whereof I affix my signature in presence of two witnesses.

ROBERT SMITH MAYER.

Witnesses:
CHAS. O. RUSE,
E. M. SCHWEIN.